US007773615B2

(12) United States Patent
Hibino et al.

(10) Patent No.: US 7,773,615 B2
(45) Date of Patent: Aug. 10, 2010

(54) CONNECTION STATE CONTROL DEVICE, CONNECTION STATE CONTROL METHOD, AND CONNECTION STATE CONTROLLING PROGRAM

(75) Inventors: Yoshihiko Hibino, Hashima-gun (JP); Yuji Kiyohara, Nagoya (JP); Hiroaki Suzuki, Nagoya (JP); Kentaro Ushiyama, Nagoya (JP); Koichi Iijima, Tokyo (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 914 days.

(21) Appl. No.: 11/635,609

(22) Filed: Dec. 8, 2006

(65) Prior Publication Data
US 2007/0091909 A1 Apr. 26, 2007

Related U.S. Application Data

(63) Continuation-in-part of application No. PCT/JP2005/010514, filed on Jun. 8, 2005.

(30) Foreign Application Priority Data

Jul. 16, 2004 (JP) ............................. 2004-210596

(51) Int. Cl.
*H04L 12/44* (2006.01)
(52) U.S. Cl. ..................... 370/408; 370/420; 709/201; 709/231; 709/252
(58) Field of Classification Search .................. 370/390, 370/400, 401, 408, 420, 432, 463; 709/201, 709/203, 218, 219, 220–224, 231, 252
See application file for complete search history.

(56) References Cited

U.S. PATENT DOCUMENTS 6,321,270 B1 * 11/2001 Crawley ..................... 709/238
6,337,715 B1 1/2002 Inagaki et al.

(Continued)

FOREIGN PATENT DOCUMENTS

CA 2 451 945 A1 7/2004

(Continued)

OTHER PUBLICATIONS

Cain et al.; "Internet Group Management Protocol, Version 3;" IETF Standard; Oct. 1, 2002; The Internet Society.

(Continued)

*Primary Examiner*—Pankaj Kumar
*Assistant Examiner*—Duc T Duong
(74) *Attorney, Agent, or Firm*—Oliff & Berridge, PLC

(57) ABSTRACT

A connection state control device is provided that can promptly perform a reproducing operation by smoothly switching channels at each node and reduce the load on the management server in a case where operations are performed so as to sequentially change distribution information to be received at each node in a network system having a tree structure.

A node receives content being distributed over a network, and performs an operation of reproducing the received content. When the node is to receive different content being distributed over a different network, the node is connected to the different network. After that, the node receives and reproduces the different content. The node continues to receive the original content but suspends the operation of reproducing the original content after connected to the different network.

20 Claims, 7 Drawing Sheets

U.S. PATENT DOCUMENTS

| | | | |
|---|---|---|---|
| 6,944,135 B2 * | 9/2005 | Novaes | 370/256 |
| 7,583,796 B2 * | 9/2009 | Tomikawa et al. | 379/221.02 |
| 2003/0101253 A1 | 5/2003 | Saito et al. | |
| 2004/0244037 A1 | 12/2004 | Yamaguchi et al. | |
| 2005/0076104 A1 * | 4/2005 | Liskov et al. | 709/223 |
| 2005/0197908 A1 * | 9/2005 | Asami | 705/26 |
| 2010/0115079 A1 * | 5/2010 | Sakoda et al. | 709/223 |

FOREIGN PATENT DOCUMENTS

| | | |
|---|---|---|
| EP | 0 693 856 A2 | 1/1996 |
| EP | 0 889 645 A2 | 1/1999 |
| JP | A 2002-314600 | 10/2002 |
| JP | A 2003-169089 | 6/2003 |
| JP | A 2003-324711 | 11/2003 |

OTHER PUBLICATIONS

Cho et al.; "Improvement of Channel Zapping Time in IPTV Services Using the Adjacent Group Join-Leave Method;" *Advanced Communication Technology, 2004.* The 6th International Conference NCE on Phoenix Park, Korea Feb. 9-11, 2004, Piscataway, NJ, USA. IEEE; pp. 971-975; vol. 2.

* cited by examiner

| CHANNEL NUMBER | STATUS FLAG | BUFFER ADDRESS OUTPUT COUNTER INPUT COUNTER | REPRODUCING FLAG | UPPER NODE NUMBER IP ADDRESS | NUMBER OF LOWER NODES | LOWER NODE NUMBER IP ADDRESS |
|---|---|---|---|---|---|---|
| 1 | STABLE | BUFFER 1 | REPRODUCING | 11<br>100.100.10.16 | 1 | 15<br>100.100.10.18 |

T

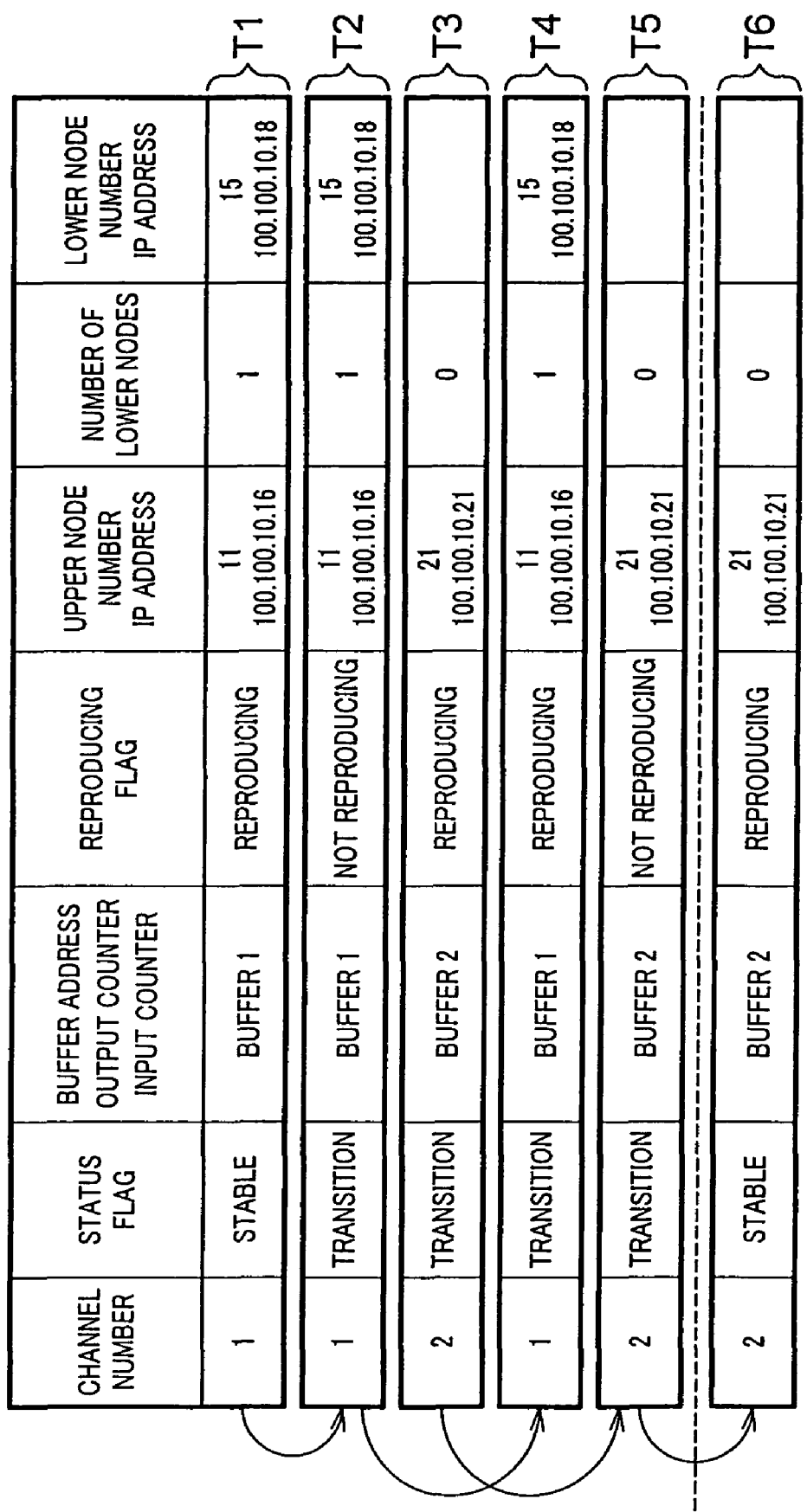

CONNECTION STATE CONTROL DEVICE, CONNECTION STATE CONTROL METHOD, AND CONNECTION STATE CONTROLLING PROGRAM

BACKGROUND OF THE INVENTION

1. Field of the Invention

The present invention relates to a connection state control device, a connection state control method, and a connection state controlling program, and more particularly, to a connection state control device that controls the connection state of each of a distribution device as a distributor of distribution information and relay devices connected to the distribution device located at the top, a connection state control method, and a connection state controlling program to be used for controlling the connection state.

2. Discussion of the Related Art

As the Internet connections for general households have become high-speed connections in recent years, network systems that distribute so-called content such as music or movies are being more and more widely spread. In such a network system, personal computers or the like at households are connected so as to form a network, with one distribution device as a distributor being at the top (the network seen from the viewpoint of connection states is referred to as "topology"). Content such as music or a movie is distributed from the distribution device via the network.

In such a network, the distribution device and the personal computers constituting the network are referred to as "nodes". Recently, so-called broadband routers, broadband set top boxes, and the like having the functions of those nodes are available on the market.

Further, each distribution device distributes distribution information different from others, and the nodes belonging to hierarchies below the distribution device are designed to receive the distribution information from several distribution devices. One of the nodes is designed to perform a reproducing operation upon receipt of the distribution information of different types from the distribution devices. This distribution of different distribution information using distribution devices of different types is a kind of multicast distribution, and each of the distribution devices serving as distributors (or each transmission path used for distributing information from the distribution devices) is sometimes referred to as a channel as in conventional television broadcasting. In this distribution system, the address of each distribution device as a distributor and the information indicating which line (channel) is being used for distributing the distribution information are often managed in an integrated fashion by a so-called management server provided in the network. When there is a request for distribution of information stored at a node, the node inquires of the management server for the address of the distribution device as the distributor of the distribution information and the address of the closest node on the line through which the distribution information is being distributed. Using the addresses obtained as a reply from the management server in response to the inquiry, the node is newly connected to the line through which the distribution information is being distributed.

In a case where a node is to selectively receive information distributed from channels of different types, the node checks the distribution information (more specifically, each piece of music and each movie being distributed as distribution information are checked), and selects the desired distribution information. In this case, after the distribution information from a distribution device is viewed for only a very short period of time, switching to distribution information distributed from another distribution device might be repeated (the switching of distribution information in a short time is sometimes referred to as a zapping operation).

A conventional technique involving broadband routers and the like having the functions of the nodes is disclosed in the following patent document, for example:

Patent Document 1: Japanese Patent Unexamined Publication No. 2003-169089

In the above-described conventional network system, however, when the zapping operation is often performed in the multicast distribution, the line to which a node is connected is often changed through the frequent zapping operation. As a result, accumulation of distribution information in each node is started from zero every time lines are switched, and a certain period of time is required until the accumulation of distribution information necessary to start a reproducing operation is completed at each node. This hinders smooth line switching and reproduction.

SUMMARY OF THE INVENTION

The present invention has been developed, with the above-described problems being taken into consideration. The object of the present invention is to provide a connection state control device that can smoothly switch lines for each node and promptly reproduce distribution information in a case where distribution information to be received at each node is repeatedly changed. The present invention also provides a connection state control method and a control state controlling program to be used for controlling the connection state.

In order to solve the above problems, the invention of claim 1 relates to a connection state control device comprising:

a connecting means that connects a terminal device that receives a piece of distribution information being distributed over a network and performs an output operation for the received piece of distribution information, to another network when the terminal device is to receive another piece of distribution information being distributed via the another network;

a receiving means that causes the terminal device to receive the another piece of distribution information after the terminal device is connected to the another network, and causes the terminal device to perform an output operation for the another piece of distribution information; and a switch controlling means that causes the terminal device to continue receiving the piece of distribution information and causes the terminal device to suspend the output operation using the piece of distribution information, after the terminal device is connected to the another network.

BRIEF DESCRIPTION OF THE DRAWINGS

FIG. 2A is a block diagram of the node; and FIG. 2B shows examples of the contents of a connection status table;

FIG. 4 shows examples of changes made to the contents of the connection status tables as a result of changes made to the topology in accordance with this embodiment.

DETAILED DESCRIPTION OF THE PREFERRED EMBODIMENTS

The following is a description of preferred embodiments of the present invention, with reference to FIGS. 1 through 5C. In the embodiments described below, the present invention is applied to a control operation for controlling the type of connection between the nodes in a network system that contains a node as a distributor of content that is distribution information and other nodes that form hierarchies with respect to the node and are connected to one another in a tree structure.

Figure 1:
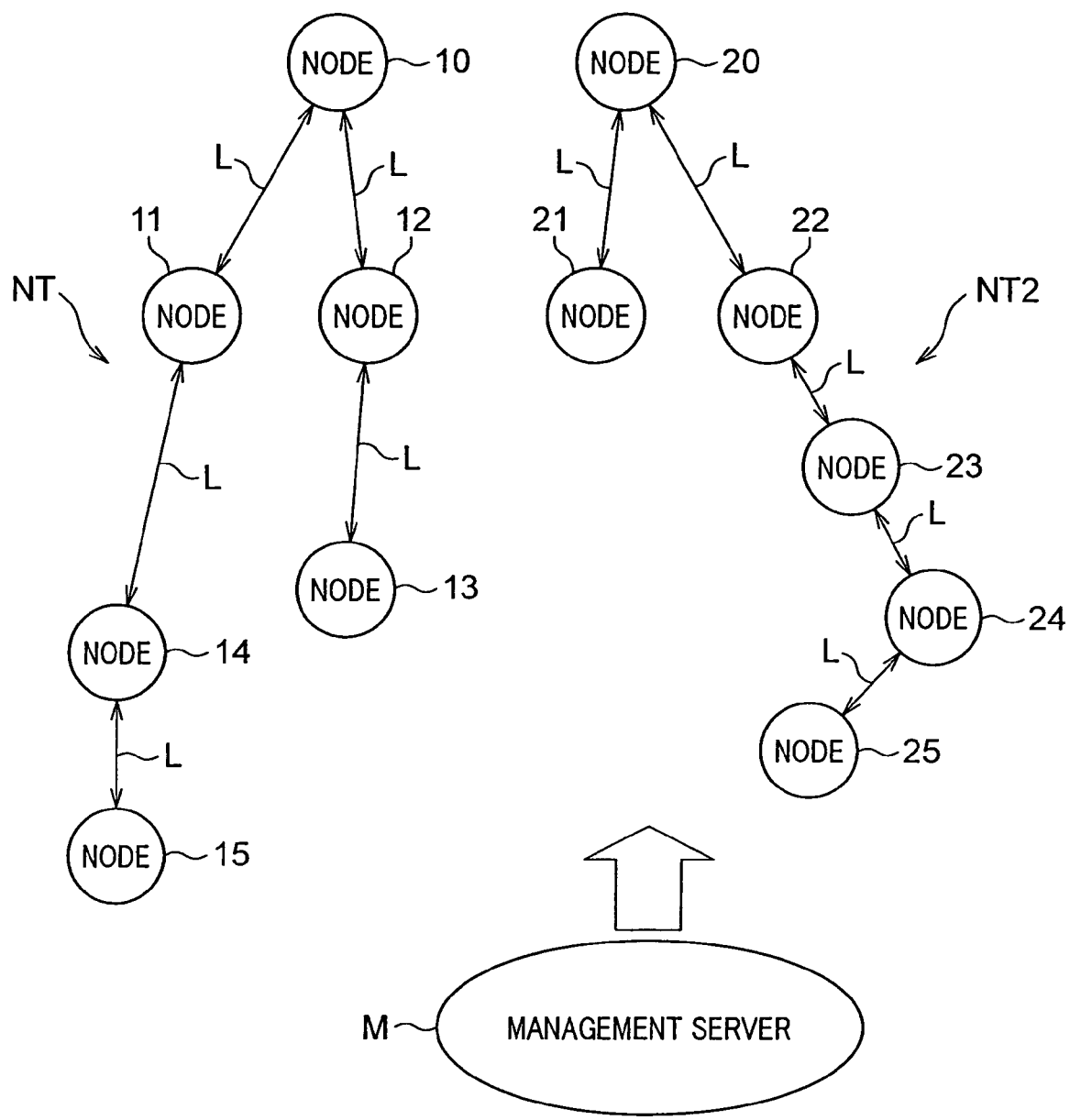
FIG. 1 is a block diagram showing a schematic structure of a network system in accordance with an embodiment of the present invention.
Figures 2A, 2B:
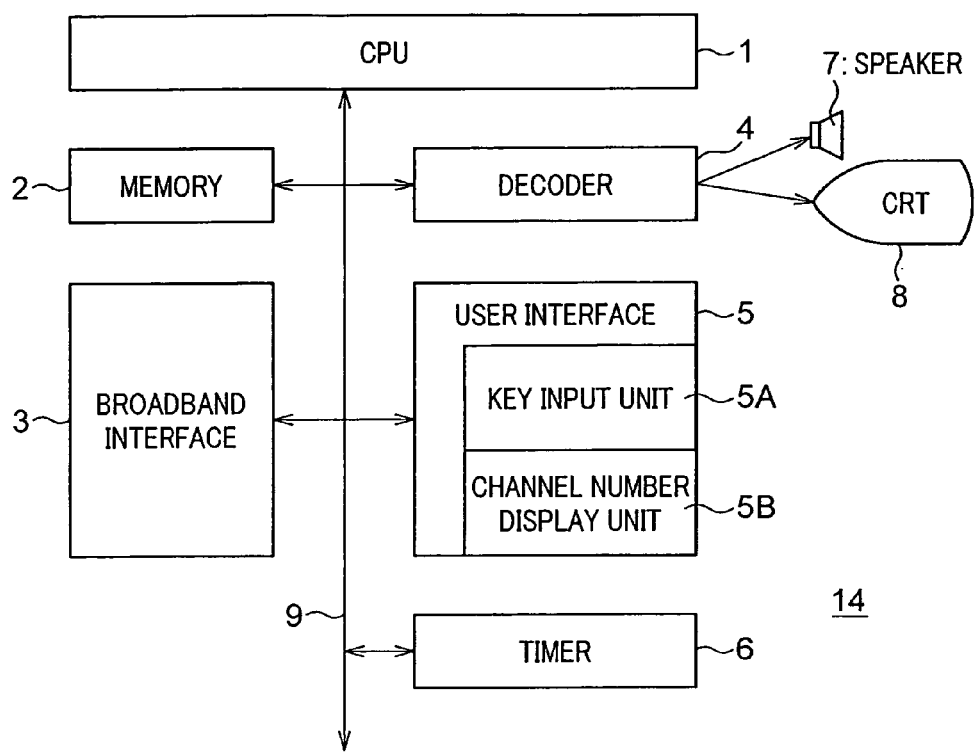
FIGS. 2A and 2B illustrate the structure of a node contained in the network system in accordance with this embodiment.
Figure 3:
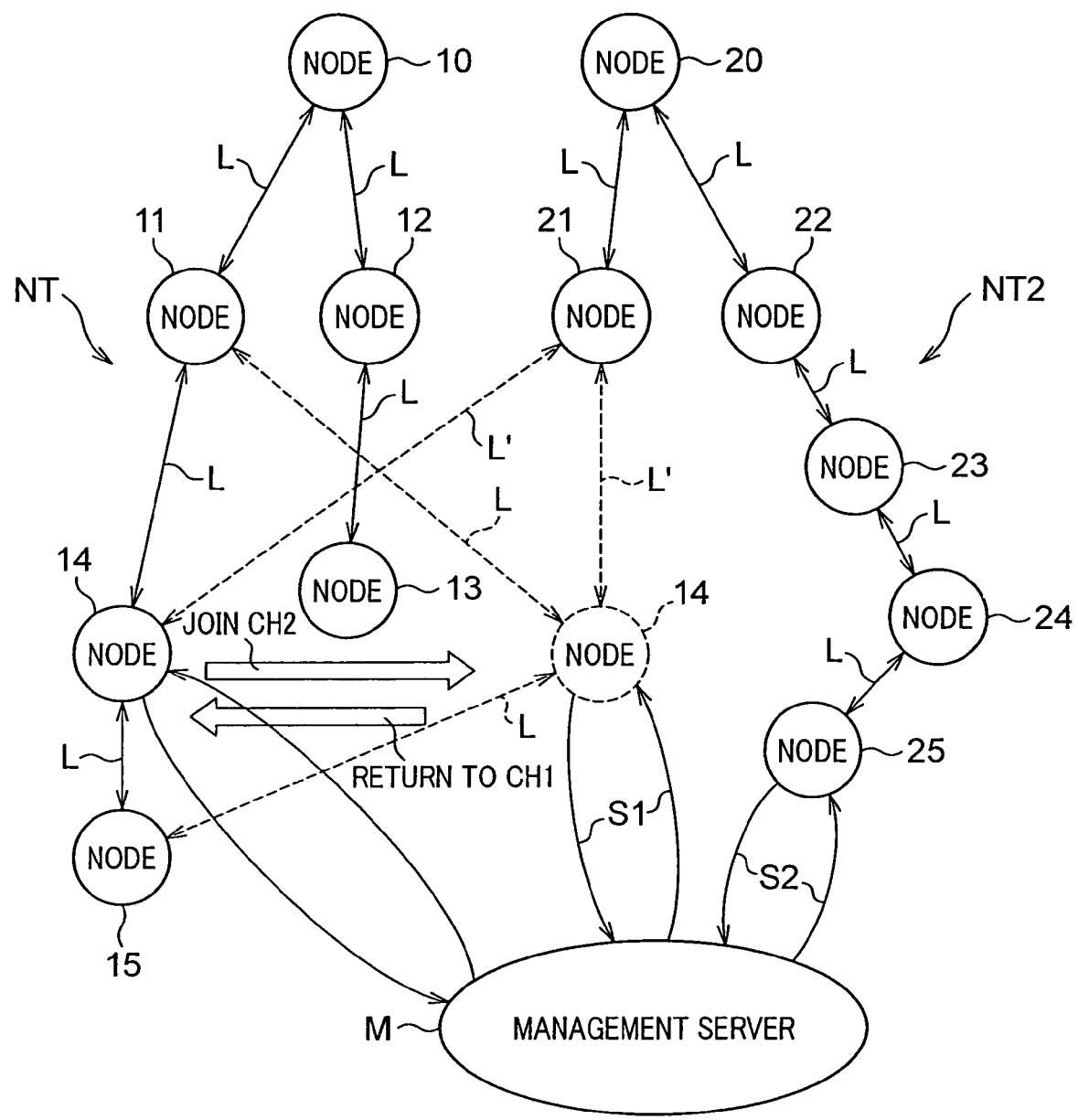
FIG. 3 is a block diagram showing an example change to the topology in accordance with this embodiment.
Figure 5A:
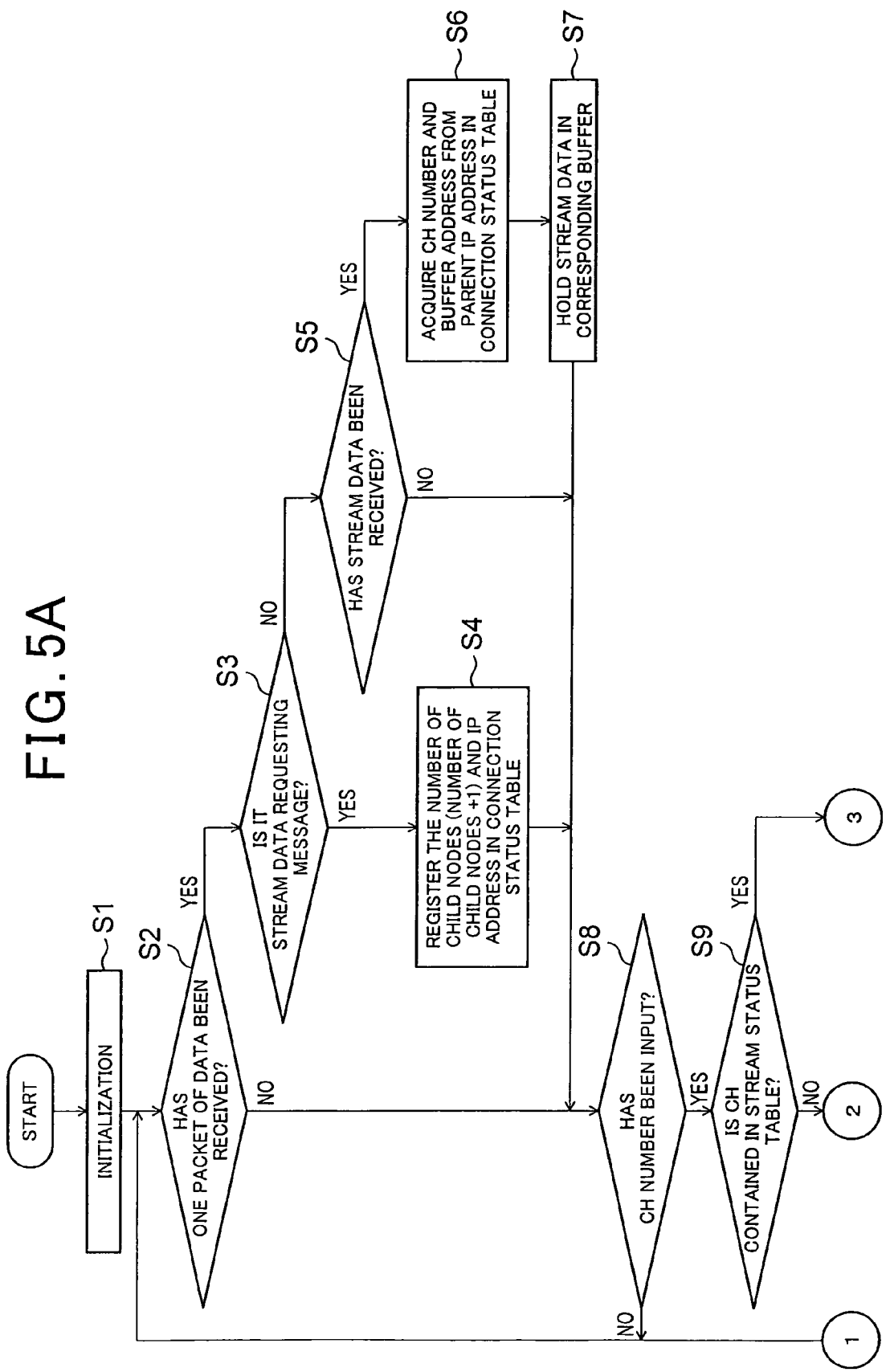
FIGS. 5A to 5C are flowcharts of the operation to be performed in the network system in accordance with this embodiment.
Figure 5B:
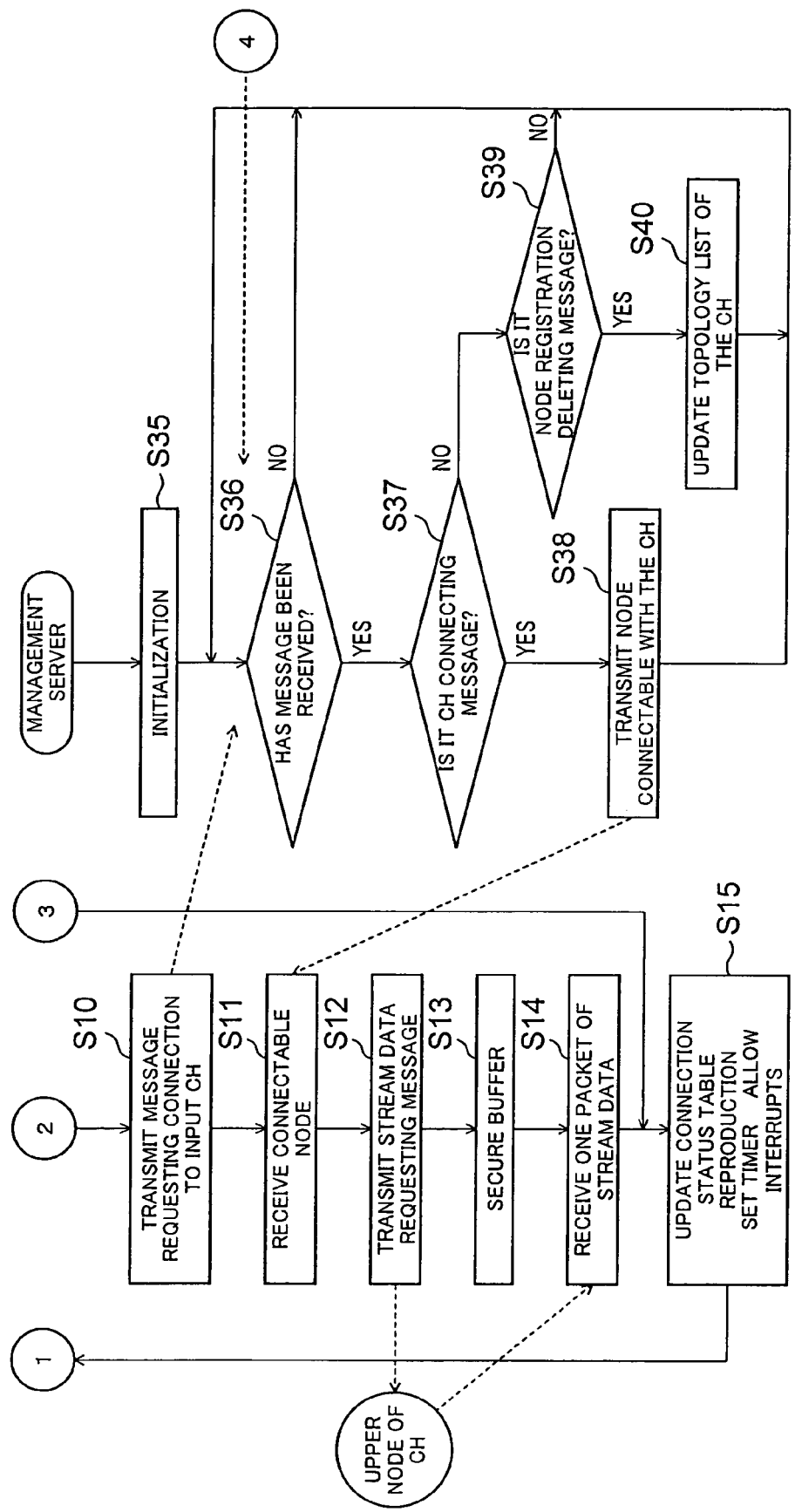
Figure 5C:
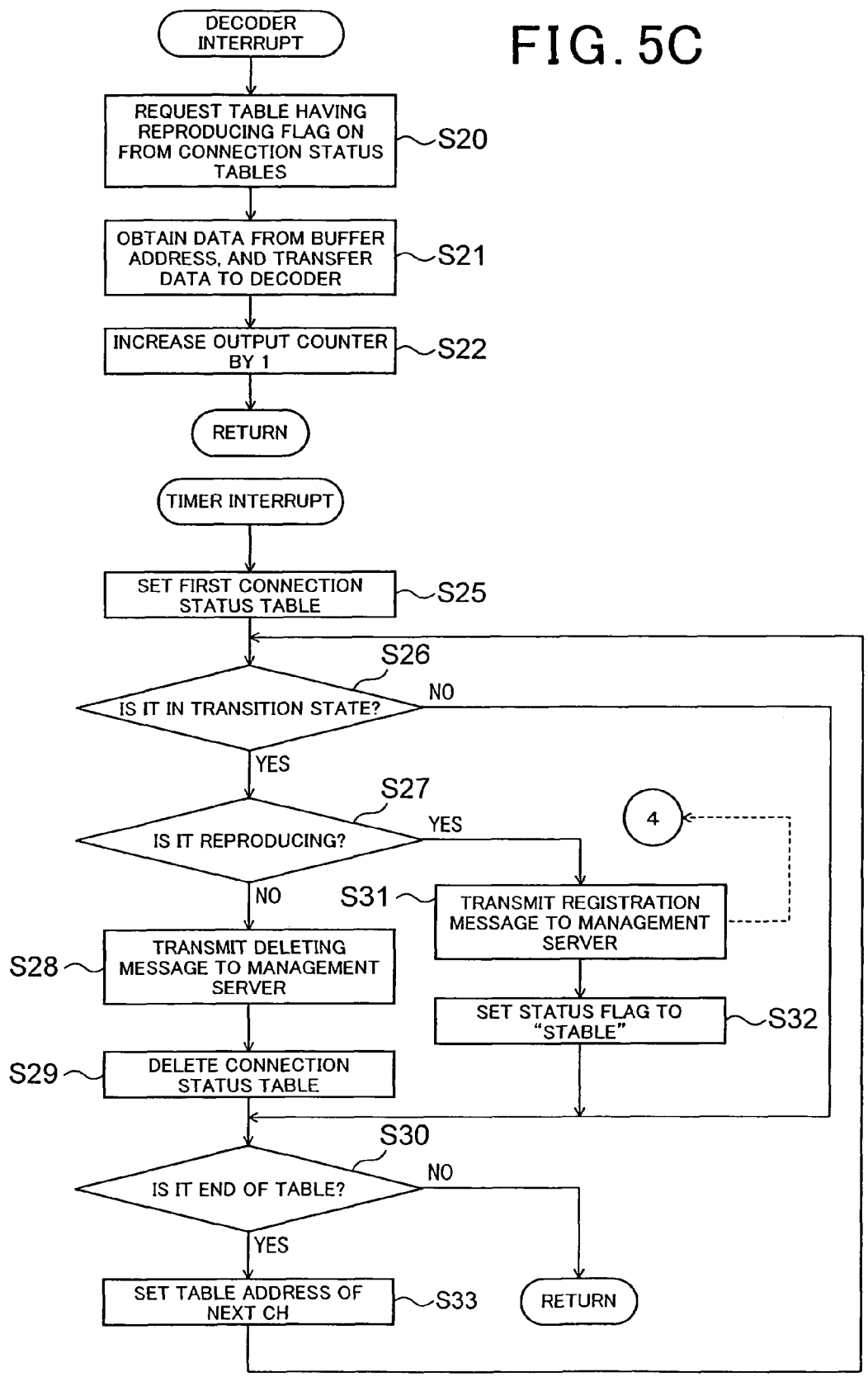

FIG. 1 is a block diagram of a schematic structure of a network system in accordance with an embodiment of the present invention. FIGS. 2A and 2B illustrate the structure of each of the nodes in the network system in detail. FIGS. 3 and 4 show the procedures for switching channels when the zapping operation is performed in the network system. FIGS. 5A, 5B, 5C are flowcharts showing the channel switching procedures.

Referring first to FIG. 1 and the block diagram of FIG. 2A, an example structure of the network system in accordance with an embodiment in a regular state before the channel switching procedures are carried out is described.

As shown in FIG. 1, a network system NT in accordance with a first embodiment is formed in a tree structure, with a node 10 as a distribution device being the apex. Meanwhile, a network system NT2 is formed in a tree structure, with a node 20 as a distribution device being the apex.

The network system NT includes nodes 11 and 12 that serve as the nodes constituting a first hierarchy, as seen from the node 10, nodes 13 and 14 that serve as the nodes constituting a second hierarchy, and a node 15 that serves as the node constituting a third hierarchy. Meanwhile, the network system NT2 includes nodes 21 and 22 that serve as the nodes constituting a first hierarchy, seen from the node 20, a node 23 that serves as the node constituting a second hierarchy, a node 24 that serves as the node constituting a third hierarchy, and a node 25 that serves as the node constituting a fourth hierarchy. The nodes are connected to one another so that mutual communication can be performed through a line L that is a wired or wireless line, with the node 10 (in the network system NT) or the node 20 (in the network system NT2) being the apex.

In this specific example of the nodes, the nodes 10 and 20 at the apexes of the network systems are equivalent to servers to be the distributors of contents, and all the other nodes than the nodes 10 and 20 are formed from devices such as personal computers that are provided in general households.

In the network systems NT and NT2 shown in FIG. 1, the content desired by the user of each node, is distributed via another node contained in the hierarchy located above the node through the line L in each of the network systems NT and NT2, with the node 10 or 20 being the distributor. Here, the content is of course distributed in a digitized state, with a so-called "packet" being a unit. Packet numbers that indicate the reproduction order or the order of storage in a buffer memory or the like are allotted to the respective packets.

In the network systems NT and NT2 shown in FIG. 1, different types of contents are distributed from the nodes 10 and 20. For example, foreign movies are distributed from the network system NT, while Japanese movies are distributed from the network system NT2.

At the node 14, for example, channels are switched to select a foreign movie being distributed in the network system NT or a Japanese movie being distributed in the network system NT2. In this aspect, multicast distribution is performed when the two network systems shown in FIG. 1 are seen as one. The management server M contained in the system that performs the multicast distribution manages, in an integrated fashion, information such as the addresses (uniquely determined addresses, such as IP (internet protocol) addresses in this embodiment) of the nodes to be the distributors (the nodes 10 and 20 in the case shown in FIG. 1) and the addresses of the nodes located on the line L over which the content is being distributed, and information such as the content distribution starting time and the distribution duration. In a case where the content stored at the node 14 is requested, for example, the node 14 inquires of the management server M for the address or the like of the closest node on the line L over which the content is being distributed from the distributor. Using the address obtained from the management server M in response to the inquiry, the node 14 newly adds the node to the network system over which the content is being distributed. Here, the management server M may supply more than one address.

Referring now to FIG. 2A, the structure of each node is described in detail. In the following description, the structure of the node 14 in the network system NT shown in FIG. 1 is described in detail, but each of the other nodes has exactly the same structure as the node 14.

As shown in FIG. 2A, the node 14 includes a CPU 1 that serves as a connecting means, a switch controlling means, a relaying means, and a prohibiting means, a memory 2, a broadband interface 3, a user interface 5, a decoder 4, a timer 6, a speaker 7, and a CRT (Cathode Ray Tube) 8 that serves as a display means. The CPU 1, the memory 2, the broadband interface 3, the decoder 4, the user interface 5, and the timer 6 are connected to one another via a bus 9.

The user interface 5 includes a channel number display unit 5B that is formed from a liquid crystal panel or the like for displaying the number of the channel through which the content designated by the user who has requested viewing is being distributed, and a key input unit 5A that has a numeric keypad, a "+" key, a "−" key, an Enter key for confirming each operation, and the like.

Next, the entire operation is described.

The broadband interface 3 is connected directly to the line L. The node 14 is connected to the broadband interface 3 contained likewise in the node 11 belonging to an upper hierarchy as shown in FIG. 1 via the line L, and is also connected to the broadband interface 3 contained in the node 15 belonging to a lower hierarchy via the line L. In this structure, content can be exchanged in packets and the control information necessary for content exchanges can be exchanged in packets between the nodes. Further, each broadband interface 3 is designed to exchange various kinds of information with the management server M.

A connection status table T shown in FIG. 2B is stored in the memory 2. The connection status table T will be described later in detail. Other than the connection status table T, a ring buffer memory of a so-called FIFO (First In First Out) format is stored in the memory 2. This ring buffer memory is set for each channel in the memory 2. A predetermined recording amount of data corresponding to the content distributed from the node 11 belonging to the upper hierarchy is stored in the order of distribution. Under the control of the CPU 1, the data is read out in the storing order, and is output to the decoder 4 via the bus 9. This operation is performed for each channel independently of the other channels.

Through this operation, the decoder 4 decodes the data of the content output from the ring buffer memory via the bus 9. The image data among the decoded data is output to the CRT 8 for display, and the audio data is output to the speaker 7 for sound emission.

Referring back to FIG. 2A, after the channel selection, the timer 6 measures the time elapsed since the system enters a transition state (described later). Where a predetermined period of time has passed, the timer 6 resets the system to a stable state (described later). Although the timer 6 is used in this embodiment, the number of packets received after the channel selection may be used for measuring the elapsed time.

Referring now to FIG. 2B, the contents of the connection status table T are described. In the memory 2, one connection status table T shown in FIG. 2B is stored for each channel to which the node 14 has been connected.

As shown in FIG. 2B, the connection status table T contains information as to each channel, such as the channel number, the status flag, the buffer address, the output counter, the input counter, the reproducing flag, the upper node number and its IP address, the number of lower nodes, the lower node number and its IP address.

Here, the "channel number" represents the number allotted to the channel being used for content distribution (channel "1" in the example case shown in FIG. 2B), and each content has one channel number.

The "status flag" is a value indicating a "stable" state when the same connection state continues after the predetermined period of time measured by the timer 6 has passed (where the same content is being distributed from the same upper node through the same cannel and also being distributed to the lower node). The "status flag" is a value indicating a "transition" state when there is a possibility that channels are readily switched before the predetermined period of time has passed since the channel switching.

The "buffer address", the "input counter", and the "output counter" are used for managing the ring buffer memory provided for each channel. The "buffer address" is the information for identifying the ring buffer memory corresponding to the content (channel) being currently received. The "input counter" is the value of the counter that is incremented as content is input to the ring buffer memory. The "output counter" is the value of the counter used for outputting data from the ring buffer memory to the decoder 4 or a lower node. The combination of the "buffer address" and the "input counter" can cause the CPU 1 to recognize the address of the data to be input in the memory 2. The combination of the "buffer address" and the "output counter" can cause the CPU 1 to recognize the initial address of the data to be output in the memory 2.

Further, the "reproducing flag" is the information that indicates whether the data of the content being distributed through the currently selected channel is actually being reproduced by the node 14 (or whether the data of the content is being displayed on the CRT 8 and being emitted from the speaker 7).

The "upper node number and its IP address" represents the node number allotted to the node that is supplying the data of the content to the node 14, which is the node number allotted to the node 11 (i.e., "11"), and its IP address ("100.100.10.16" in the example case shown in FIG. 2B).

The "number of lower nodes" indicates the number of nodes existing in the hierarchy immediately below the node 14 distributing the content data ("1" in the example case shown in FIG. 1), and the number of combinations of the "lower node numbers and IP addresses of the lower nodes" that follow.

The "lower node number and its IP address" represents the node number allotted to the node existing in the hierarchy immediately below the node 14 distributing the content data, which is the node number allotted to the node 15 (i.e., "15"), and its IP address ("100.100.10.18" in the example case shown in FIG. 2B).

Referring now to FIGS. 3 through 5C, an operation to be performed in each of the network systems NT and NT2 is described. This operation is performed in a case where the zapping operation is performed through the key input unit 5A of the node 14 that belongs to the network system NT1 (the channel number in the network system NT being "1") and has received the content distributed from the node 10, so as to check the content being distributed in the network system NT2 (the channel number in the network system NT2 being "2").

As shown in FIG. 1, the node 14 is reproducing the content of the channel 1, while receiving the distribution of the content of the channel 1. In this case, the content is distributed from the node 11, which is located immediately above the node 14, via the line L. The node 14 reproduces the content, while distributing the content to the node 15, which is located immediately below the node 14, via the line L. Here, the connection status table T in the memory 2 of the node 14 is the same as the connection status table T1 shown in FIG. 4, which is of course the same as that shown in FIG. 2B.

When the user who has been viewing the content of the channel 1 at the node 14 performs an operation to view the content of the channel 2 through the key input unit 5A in this situation, the CPU 1 in the node 14 uses a control signal $S_1$ to inquire of the management server M for the connection destination (the node 21 in the example case shown in FIG. 3) so as to receive the distribution of the data of the content of the channel 2 at the node 14.

Here, the management server M has all the information as to the topology form at each channel with respect to all the nodes managed by the management server M (such as the IP address of each node, the connection destinations, and the channel numbers). In response to the inquiry from the node 14, the management server M uses the control signal $S_1$ to notify the node 14 that the node to be connected for receiving the distribution of the content data of the channel 2 is the node 21. The management server M also notifies the node 14 of the IP address of the node 21.

At the node 14 that has received the above information, a line L' is connected to the node 21 on the basis of the supplied IP address, and a control signal for requesting distribution of the data of the content of the channel 2 to the node 14 is transmitted. Through this process, the new participation of the node 14 in the network system NT2 is established, and the node 14 can receive and reproduce the data of necessary content. Here, a connection status table T3 shown in FIG. 4 is newly formed as the connection status table T in the memory 2 of the node 14. In the connection status table T3 at this point, the status flag has a value indicating "transition" as it is immediately after the switching to the channel 2, as shown in FIG. 4. The buffer address, the input counter, and the output counter show a value indicating "buffer 2" that is newly set in the memory 2 for the content of the channel 2. The reproducing flag has a value indicating "reproducing" as the content of the channel 2 is being reproduced at the node 14. The upper node number and its IP address indicate the node number of the node 21 from which the node 14 is currently receiving the distribution of the data of the content of the channel 2 (i.e., "21") and the IP address of the node 21 ("100.100.10.21" in the example case shown in FIG. 4). The number of lower nodes is "0" as any other node to which the data of the content of the channel 2 is to be distributed does not presently exist below the node 14. Accordingly, no values are set to the lower node number and its IP address.

Meanwhile, if the status flag indicates "transition" with respect to the channel 2 immediately after the node 14 participates in the network system NT2, the line L is still connected between the node 11 and the node 15 in the network system NT, and the data distribution from the node 11 to the node 14 to the node 15 continues. Accordingly, the information that the node 14 has withdrawn from the network system NT has not been exchanged with the management server M. At this stage, the connection status table T1 existing before the zapping operation is replaced with a connection status table T2 in the memory 2 of the node 14. The values in the connection status table T2 are the same as those in the connection status table T1, except that the reproducing flag indicates "not reproducing" and the status flag indicates "transition".

As described above, the information that the node 14 has withdrawn from the network system NT has not been exchanged with the management server M. Accordingly, from the viewpoint of the management server M, the node 14 still belongs to the network system NT.

When each status flag in the connection status tables T2 and T3 of the node 14 indicates "transition", a node 25 shown in FIG. 3 may newly participate in the network system NT, so as to receive the data of the content of the channel 2. In this case, the node 25 should be connected to the hierarchy immediately below the node 14 where the number of nodes extending from the node 20 as the distributor is small, and receive the data in such a situation. However, since each status flag in the connection status tables T2 and T3 of the node 14 indicates "transition" as described above, the node 14 might be readily switched to another channel, and the management server M still manages the node 14 as a node in the network system NT. Therefore, when receiving a new participation request as a control signal $S_2$ from the node 25, the management server M refers the node 25 to the node 24, instead of the node 14. As a result, the node 25 is connected to the node 24 as shown in FIG. 3, and receives the distribution of the data of the content of the channel 2 through the node 24.

When each status flag in the connection status tables T2 and T3 of the node 14 indicates "transition", a further zapping operation may be performed to return to the channel 1 and receive the data of the content of the channel 1 through the key input unit 5A of the node 14. In this case, the data of the content of the channel 1 is distributed via the line L between the node 11 and the node 15. Accordingly, the node 14 can promptly return to the reproduction of the content of the channel 1 simply by switching the reproduction objects from the data of the content of the channel 2 to the data of the content of the channel 1, without inquiring the management server M of the information as to the node 11.

When the status flag with respect to the channel 2 indicates "transition" immediately after the reproduction of the content of the channel 1 is resumed (see the connection status table T2 that will be described later), the line L' is still connected to the node 21 in the network system NT2, and the distribution of the data of the content of the channel 2 from the node 21 to the node 14 continues.

As for the connection status table T in the memory 2 of the node 14 immediately after resuming the reproduction of the content of the channel 1, the connection status table T2 used before the further zapping operation is replaced with the connection status table T4, as shown in FIG. 4. The values shown in the connection status table T4 are the same as those shown in the connection status table T2, except that the reproducing flag indicates "reproducing". At the same time as this, the connection status table T3 used before the further zapping operation is replaced with a connection status table T5. The values shown in the connection status table T5 are the same as those shown in the connection status table T3, except that the reproducing flag indicates "not reproducing".

In a case where the reproduction of the content of the channel 2 continues when each status flag in the connection status tables T2 and T3 indicates "transition", and the predetermined period of time measured by the timer 6 has passed, the node 14 determines that the reproduction of the content of the channel 2 should be continued. Accordingly, the information that the node 14 officially withdraws from the network NT (that the line L between the node 11 and the node 15 is cut off) and the information that the node 14 joins the network system NT2 are sent as the control signal $S_1$ to the management server M. The management server M then performs an operation to cope with the fact that the node 14 newly joins the network system NT2 and is connected to the hierarchy immediately below the node 21 in the network system NT2. As for the connection status table T in the memory 2 of the node 14 at this point, the connection status table T4 used for the channel 1 is erased, and the connection status table T5 is replaced with a connection status table T6. The values shown in the connection status table T6 are the same as those shown in the connection status table T5, except that the status flag indicates "stable".

FIGS. 5A, 5B, and 5C are flowcharts showing the operations to be performed by the node 14 and the management server M through the above-described series of processes.

As described above, the IP address of the management server M is recognized by each node, and the management server M manages the topology for each channel.

As shown in FIG. 5C, the interrupt processing to be performed at the node 14 involves interrupts by the decoder 4 and timer interrupts that serve as triggers for switching from the above-described transition state (where the status flag indicates "transition") to a stable state (where the status flag indicates "stable").

As shown in FIG. 5A, when the power is turned on at the node 14 belonging to the network system NT, the necessary initializing process is performed (step S1). After that, monitoring is constantly performed to determine whether a packet of content data is received and whether a channel input operation is performed through the user interface 5 (steps S2 and S8).

When a packet is received in this situation ("Y" in step S2), the CPU 1 checks the packet, and determines whether the packet contains a content data requesting message from a lower node (the node 15 in the example case shown in FIG. 1; the lower node being referred to as "child node" in FIG. 5A) requesting transfer of the content data stably received in the network system NT at present to the lower node (step S3), or whether the packet is sent from an upper node (the node 11 in the example case shown in FIG. 1) of the channel 1 to which the node 14 is currently connected (step S5).

If the packet received in step S1 is a data requesting message ("Y" in step S3), the message should contain a channel number and a lower node number and its IP address. Accordingly, the number of lower nodes in the connection status table T corresponding to the channel number is increased by "1", and the lower node number and its IP address are newly registered (step S4). Hereafter, every time a packet is received from an upper node, the packet is transferred to the newly registered lower node.

If the packet received in step S1 is a packet from the node 11 ("Y" in step S5), the IP address of the sender is compared with the IP address of the upper node stored in the connection status table T. On the basis of the buffer address and the input counter of the same channel ("CH" in FIG. 5) as the packet (step S6), the packet of necessary data is stored in the ring buffer memory (step S7). Further, if lower nodes are connected, this stream data is transmitted to all the child nodes.

If a channel number is designated by the user in step S8 ("Y" in step S8), the connection status table T currently stored for each channel in the memory 2 is checked (step S9). If any of the connection status table T corresponds to the designated channel ("Y" in step S9), the reproducing flag in the connection status table T corresponding to the channel is set to "reproducing", and all the reproducing flags in the connection status tables T corresponding to the other channels are set to "not reproducing". The status flag in each of the connection status tables T is updated to "transition". The time measurement is started by the timer 6, and execution of a timer interrupt is allowed (step S15).

If there is not a connection status table T corresponding to the designated channel ("N" in step S9), a connection requesting message for connection to the designated channel (the channel 2 in the example case shown in FIGS. 3 and 4) is sent to the management server M (step S10), and the IP address of an upper node that is connectable for the new channel (step S11).

A content data requesting message is then transmitted to the upper node (the node 21 in the example case shown in FIGS. 3 and 4) (step S13), and a ring buffer memory for the new channel is set in the memory 2 (step S13). The data of content from the upper node is received (step S14).

Various kinds of information as to the channel that is being currently received, more specifically, the channel number, the status flag (set to "transition", the buffer address and the input counter and the output counter, the reproducing flag, the upper node number of its IP address, and the number of lower nodes (set to "0") are added as the corresponding connection status table T. The status flag and the reproducing flag in each of the connection status tables T corresponding to the other channels are set to "transition" and "not reproducing", respectively. The time measurement by the timer 6 is then started, and execution of a timer interrupt is allowed (step S15).

The reproducing flag in the connection status table T corresponding to the channel is set to "not reproducing" when a packet is received in the above-described series of procedures, because the reproducing flag in the connection status table T corresponding to the channel is set to "reproducing" only after the first one packet is stored in the ring buffer memory. In this manner, the decoder 4 can be prevented from decoding another packet that has arrived earlier.

At the same time as the procedures of steps S1 through S15, a predetermined initializing process is carried out by the management server M (step S35). The management server M awaits a message from any of the nodes under control (step S36). When a message is received ("Y" in step S36) and the received message is a request for connection to a new channel ("Y" in step S37, see step S10), the IP address of an upper node that is connectable to the new channel is sent as a reply to the node that has sent the connection requesting message (step S38). If the received message is a message notifying that a node is to withdraw from one of the channels ("Y" in step S39), the list showing the topology at the channel is updated (step S40).

When a timer interrupt occurs (or when the status flag in the connection status table T of the node is changed to "stable"), the CPU 1 first checks the first connection status table T among the connection status tables T stored in the memory 2 (step S25). If the status flag indicates "transition" ("Y" in step S26) and the reproducing flag indicates "not reproducing" in the first connection status table T ("Y" in step S27), a message notifying that the node is to be removed from the topology of the channel corresponding to the first connection status table T is transmitted to the management server M (step S28). The first connection status table T is then deleted from the memory 2 (step S29). If the checking is not completed in the first connection status table T ("N" in step S30), the checking is continued. If the checking is completed in the first connection status table T ("Y" in step S30), the above-described procedures are repeated for the next connection status table T.

If the status flag indicates "transition" ("Y" in step S26) and the reproducing flag indicates "reproducing" in the connection status table T ("Y" in step S27), a message notifying that the node is to be added to the topology of the channel corresponding to the connection status table T is transmitted to the management server M (step S31). The status flag in the connection status table T is then changed to "stable" (step S32), and the operation moves on to step S30. The registration in the management server M enables data distribution to a lower node newly connected to the network system.

A decoder interrupt as a process to be performed by the decoder 4 is generated every time data to be decoded is required. More specifically, the connection status table T corresponding to the channel having the reproducing flag indicating "reproducing" is detected from the connection status tables T (step S20). In accordance with the buffer address and the output counter set in the detected connection status table T, the address of the data to be retrieved from the ring buffer memory is recognized, and the data of one packet is output to the decoder 4 (step S21). The output counter is then updated (step S22), and the execution of a decoder interrupt is completed.

As described above, in the operation to be performed in the network systems NT and NT2 in accordance with this embodiment, an operation of reproducing content of a channel is suspended while the reception of the content of the channel is continued, after a node is connected to a new channel when a channel change is temporarily made through a zapping operation to the content to be reproduced by the node. Accordingly, even if the object to be reproduced through the original channel is again changed, the reproducing operation through the original channel can be promptly started.

If the objects to be reproduced are mutually changed between channels, the type of connection to the original channel is not changed. Accordingly, the objects to be reproduced can be changed among contents, without the external management server M performing an unnecessary operation of changing connection types.

Thus, without unnecessary loads on the management server M, contents to be reproduced can be quickly switched and the desired content can be reproduced.

Even after objects to be reproduced are switched, the reception of the original content and the transfer of the original content to a lower node are continued. Accordingly, the lower node can continue receiving the original channel, and the reception state at the lower node is not affected by the change of the objects to be reproduced.

Furthermore, as the reception of the original channel is suspended after a predetermined period of time has passed since the channel change, only the reception of the content of the newly selected channel can be performed when the reproducing operation no longer needs to return to the original channel.

Moreover, a lower node is not connected to the node unless only the reception of the newly selected channel is performed. Accordingly, suspension of the content reception at the lower node due to the return to the original channel after the start of the transfer of the content to the lower node can be prevented.

Even in a case where channels to be reproduced are changed and the reproducing operation returns to the original channel after the change, the reproducing operation is suspended while the reception of the content of another channel is continued at the node after the node is connected back to the original channel. Accordingly, the reproducing operation can be promptly resumed, even when the object to be reproduced is again changed from the content being currently reproduced to different content.

Furthermore, even if the channels to be reproduced are changed again, the type of connection at the channel prior to the change remains the same. Accordingly, the object to be reproduced can be again changed among contents, without an unnecessary operation of changing the types of connection.

Moreover, the reception of the channel prior to a second change is suspended when a predetermined period of time has passed since the start of the reception of a new channel. Accordingly, only the reception of the desired content can be promptly performed when the reproducing operation no longer needs to return to the channel used before the second change.

Also, since the transition to a stable state is triggered by the passage of a predetermined period of time, only the distribution of the desired content can be performed by a simple operation.

The program represented by the flowcharts shown in FIGS. 5A, 5B, and 5C may be recorded on a non-transitory information recording medium such as a flexible disk or a hard disk, or may be obtained and recorded via the Internet. The program is then read out and executed by a computer that can function as the CPU 1 of this embodiment.

As described above, the present invention can be utilized in the field of content distribution using a network system having a tree structure. Especially, the present invention can be effectively applied to content distribution often involving the above-described zapping operation, such as real-time broadcasting of movies and music.

The present invention is not confined to the configuration listed in the foregoing embodiments, but it is easily understood that the person skilled in the art can modify such configurations into various other modes, within the scope of the present invention described in the claims.

The entire disclosures of Japanese Patent Application No. 2004-210596 filed on Jul. 16, 2004, including the specification, claims, drawings, and summary are incorporated herein by reference in its entirety.

The invention claimed is:

1. A connection state control device comprising:
   a connecting unit that connects a terminal device that receives a piece of distribution information being distributed over a network and performs an output operation for the received piece of distribution information, to another network when the terminal device is to receive another piece of distribution information being distributed via the another network;
   a receiving unit that causes the terminal device to receive the another piece of distribution information after the terminal device is connected to the another network, and causes the terminal device to perform an output operation for the another piece of distribution information; and
   a switch controlling unit that causes the terminal device to continue receiving the piece of distribution information and causes the terminal device to suspend the output operation using the piece of distribution information, after the terminal device is connected to the another network.

2. The connection state control device according to claim 1, further comprising
   a relaying unit that relays the piece of distribution information to another terminal device when the terminal device is receiving the piece of distribution information and is performing the output operation for the piece of distribution information before the terminal device is connected to the another network,
   wherein the relaying unit continues to perform a relay operation to relay the piece of distribution information to the another terminal device while the terminal device continues to receive the piece of distribution information after connected to the another network.

3. The connection state control device according to claim 1, further comprising
   a suspending unit that suspends reception of the piece of distribution information at the terminal device when a predetermined requirement for connection transition is satisfied after the terminal device is connected to the another network.

4. The connection state control device according to claim 3, wherein the requirement for connection transition is that a predetermined period of time has passed since the terminal device is connected to one of the networks.

5. The connection state control device according to claim 1, further comprising
   a prohibiting unit that prohibits another terminal device from connecting with the terminal device until a predetermined requirement for connection transition is satisfied after the terminal device is connected to the another network.

6. The connection state control device according to claim 1, further comprising
   a connection recovering unit that connects the terminal device back to the network while an operation of receiving the another piece of distribution information, the output operation for the another piece of distribution information, and an operation of receiving the piece of distribution information are performed after the terminal device is connected to the another network,
   wherein:
   the receiving unit causes the terminal device to receive the piece of distribution information in the network having the terminal device connected back thereto, and perform the output operation for the piece of distribution information; and
   the switch controlling unit causes the terminal device to continue the reception of the another piece of distribution information and causes the terminal device to suspend the output operation using the another piece of distribution information after the terminal device is connected back to the network.

7. The connection state control device according to claim 6, further comprising
   a suspending unit that suspends reception of the another piece of distribution information at the terminal device when a predetermined requirement for connection transition is satisfied after the terminal device is connected back to the network.

8. A connection state control method comprising:
a connecting step for connecting a terminal device that receives a piece of distribution information being distributed over a network and performs an output operation for the received piece of distribution information, to another network when the terminal device is to receive another piece of distribution information being distributed via the another network;
a receiving step for causing the terminal device to receive the another piece of distribution information after the terminal device is connected to the another network, and causing the terminal device to perform an output operation for the another piece of distribution information; and
a switch controlling step for causing the terminal device to continue receiving the piece of distribution information and causing the terminal device to suspend the output operation using the piece of distribution information, after the terminal device is connected to the another network.

9. The connection state control method according to claim 8, further comprising
a relaying step for relaying the piece of distribution information to another terminal device when the terminal device is receiving the piece of distribution information and is performing the output operation for the piece of distribution information before the terminal device is connected to the another network,
wherein, during the relaying step, a relay operation to relay the piece of distribution information to the another terminal device is continued while the terminal device continues to receive the piece of distribution information after connected to the another network.

10. The connection state control method according to claim 8, further comprising
a suspending step for suspending reception of the piece of distribution information at the terminal device when a predetermined requirement for connection transition is satisfied after the terminal device is connected to the another network.

11. The connection state control method according to claim 8, further comprising
a prohibiting step for prohibiting another terminal device from connecting with the terminal device until a predetermined requirement for connection transition is satisfied after the terminal device is connected to the another network.

12. The connection state control method according to claim 8, further comprising
a connection recovering step for connecting the terminal device back to the network while an operation of receiving the another piece of distribution information, the output operation for the another piece of distribution information, and an operation of receiving the piece of distribution information are performed after the terminal device is connected to the another network,
wherein:
in the receiving step, the terminal device receives the piece of distribution information in the network having the terminal device connected back thereto, and performs the output operation for the piece of distribution information; and
in the switch controlling step, the terminal device continues the reception of the another piece of distribution information and suspends the output operation using the another piece of distribution information after the terminal device is connected back to the network.

13. The connection state control method according to claim 12, further comprising
a suspending step for suspending reception of the another piece of distribution information at the terminal device when a predetermined requirement for connection transition is satisfied after the terminal device is connected back to the network.

14. A non-transitory computer-readable storage medium that stores a computer-executable program for controlling a connection state of a terminal device in each network, the terminal device receiving distribution information being distributed over a plurality of networks, the program being installed in a connection state control device, the program comprising:
instructions for connecting the terminal device that receives a piece of distribution information being distributed over a network and performs an output operation for the received piece of distribution information, to another network when the terminal device is to receive another piece of distribution information being distributed via the another network;
instructions for causing the terminal device to receive the another piece of distribution information after the terminal device is connected to the another network, and causing the terminal device to perform an output operation for the another piece of distribution information; and
instructions for causing the terminal device to continue receiving the piece of distribution information and causing the terminal device to suspend the output operation using the piece of distribution information, after the terminal device is connected to the another network.

15. The non-transitory computer-readable storage medium according to claim 14, the program further comprising:
instructions for relaying the piece of distribution information to another terminal device when the terminal device is receiving the piece of distribution information and is performing the output operation for the piece of distribution information before the terminal device is connected to the another network, and
instructions for continuing to perform a relay operation to relay the piece of distribution information to the another terminal device while the terminal device continues to receive the piece of distribution information after connected to the another network.

16. The non-transitory computer-readable storage medium according to claim 14, the program further comprising:
instructions for suspending reception of the piece of distribution information at the terminal device when a predetermined requirement for connection transition is satisfied after the terminal device is connected to the another network.

17. The non-transitory computer-readable storage medium according to claim 16,
wherein the requirement for connection transition is that a predetermined period of time has passed since the terminal device is connected to one of the networks.

18. The non-transitory computer-readable storage medium according to claim 14, the program further comprising:
instructions for prohibiting another terminal device from connecting with the terminal device until a predetermined requirement for connection transition is satisfied after the terminal device is connected to the another network.

19. The non-transitory computer-readable storage medium according to claim 14, the program further comprising:

instructions for connecting the terminal device back to the network while receiving the another piece of distribution information, wherein outputting the another piece of distribution information, and receiving the piece of distribution information are performed after the terminal device is connected to the another network;

instructions for causing the terminal device to receive the piece of distribution information in the network having the terminal device connected back thereto, and perform the output operation for the piece of distribution information; and instructions for causing the terminal device to continue the reception of the another piece of distribution information and causes the terminal device to suspend the output operation using the another piece of distribution information after the terminal device is connected back to the network.

20. The non-transitory computer-readable storage medium according to claim 19, the program further comprising:

instructions for suspending reception of the another piece of distribution information at the terminal device when a predetermined requirement for connection transition is satisfied after the terminal device is connected back to the network.

\* \* \* \* \*